Patented Feb. 22, 1944

2,342,415

UNITED STATES PATENT OFFICE 2,342,415

MANUFACTURE OF MIXED ESTERS OF CELLULOSE

Carl J. Malm, Rochester, N. Y., assignor to Eastman Kodak Company, Rochester, N. Y., a corporation of New Jersey No Drawing. Application February 10, 1941, Serial No. 378,249

8 Claims. (Cl. 260—225)

This application relates to a method of preparing cellulose esters, having a high propionyl and/or butyryl content, by first pretreating part of the cellulose before adding the remainder of the cellulose to the pretreating acid.

It has been previously recognized that it is desirable in the making of high butyryl or high propionyl cellulose esters to have a low liquid to cellulose ratio in the esterification to render the propionic or butyric anhydride, which is sluggish compared with acetic anhydride, more effective by increasing its concentration. The lowest ratio of liquid to cellulose, however, which has been possible heretofore in the making of high propionyl or butyryl cellulose esters has been 6:1. The pretreatment or activation of the cellulose is ordinarily carried out in the esterification mixer and at least 2 parts of acid to one part of cellulose has been required heretofore in the pretreatment to prevent undue strain on the mixer. When butyric anhydride was employed to promote the esterification of the cellulose, the use of 4 parts of the anhydride to 1 of cellulose has been required to assure a comparatively rapid and complete reaction. Therefore, 6:1 has been heretofore accepted as the lowest limit of acylation liquid to cellulose possible in the manufacture of cellulose esters in which a large proportion of the acyl consists of fatty acid groups of 3–4 carbon atoms.

One object of my invention is to provide a method of making cellulose esters, having a high propionyl or butyryl content, which permits a lower liquid to cellulose ratio than has been thought permissible heretofore. Another object of my invention is to provide a process for making cellulose esters, having a high propionyl and/or butyryl content, in which the effectiveness of the esterifying reagents is increased as shown by an appreciable reduction of the time for esterification. A further object of my invention is to provide a method for preparing cellulose esters, having a high propionyl and/or butyryl content, in which a minimum of acetyl is necessary. Other objects will appear herein.

I have found that it is possible to use less than 2 parts of acetic acid in the activation of 1 part of cellulose if only a portion, such as one-half of the cellulose, is first mixed with acetic acid containing a small proportion of sulfuric acid and after the cellulose has been treated to a point where it exhibits physical breakdown or crumbliness, the remainder of the cellulose is added for activation. I have found that both high viscosity and low viscosity esters (as well as intermediate viscosity esters) may be prepared by processes embodying my invention. I have found that the broken down cellulose appears to lubricate the mass so that very small amounts of acetic acid may be employed for pretreating the cellulose as will be pointed out herein.

I have found that the initial degradation of the first portion of the cellulose may not adversely affect the viscosity and physical properties of the cellulose esters prepared in accordance with my invention, so that high viscosity as well as low viscosity esters may be prepared thereby.

In accordance with my invention, a pretreating liquid containing a predominant proportion of acetic acid and a small proportion of sulfuric acid is placed in the mixer in which the esterification is to be conducted (or in some other vessel in which thorough mixing may be accomplished) and a convenient proportion of cellulose for esterification, such as refined cotton linters or wood pulp, is added thereto and the mixture is thoroughly mixed together. Because of the sulfuric acid which is present in the pretreating liquids the cellulose is almost immediately "tenderized" or conditioned so that it offers considerably less resistance to mixing or stirring than the same amount of cellulose under like conditions but without the sulfuric acid.

The mass of cellulose and acid is thoroughly mixed by stirring or some other form of mixing, kneading or agitation. After the cellulose has been treated for a sufficient time that a sample of the cellulose when washed and dried gives a somewhat crumbly appearance, more cellulose is added. The time of this initial treatment may depend upon whether a high viscosity or a low viscosity product is being prepared. For example, if the treatment is carried out at 100° F., a time between approximately ¼ and ½ hour is preferred, with the usual proportion of catalyst, although for the preparation of a low viscosity ester, treatment for an hour is not objectionable. It is to be understood however that ordinarily with a small proportion of catalyst a longer time of treatment may be desirable as may also be the case where a lower temperature of treatment is used. The use of a lower temperature in the pretreatment, however, may be compensated for by employing a larger proportion of catalyst. There is a relation between the proportion of catalyst, the temperature and the time employed in the treatment of the cellulose in the first step of the pretreatment in accordance with my invention and an undue increase in any one of these must be compensated for by a decrease in one or both of the other two and vice versa.

The addition of the remainder of the cellulose, which can be done in one or more parts although no further liquid is added does not place an undue strain on the mixer as the first portion of cellulose at this stage appears to act as a lubricant facilitating the stirring and mixing of the mass. The pretreatment if at 100° F. may be continued for approximately ¾ to one hour and the cellulose is then readily susceptible to esterification even though a very small proportion of acid is present therein.

The cellulose is then esterified by treating it with an amount of anhydride sufficient to give complete esterification. For the high propionyl or butyryl esters, propionic or butyric anhydride (or their mixture) will necessarily predominate. Esterification catalyst, usually sulfuric acid, if not present in sufficient amount, should also be added to catalyze the reaction. Anyone can, obviously, use more than 4 parts of these anhydrides but this would mean the use of more anhydride for completely esterifying the cellulose than is necessary. Due to the small proportion of liquid, which in turn makes for a high concentration of anhydride and catalyst, the reaction proceeds fairly rapidly and a complete reaction is assured.

If a high viscosity ester is desired, it is necessary not only to avoid excessive breakdown in the pretreatment, but also the esterification temperature should be controlled so that the maximum reaction temperature does not exceed 80°–100° F. To do this some or all of the materials of the esterification mass should be cooled prior to the reaction as well as applying external cooling to the reaction vessel or mixer. For instance, the cellulose mass, the anhydride and the catalyst may each be cooled down to 50–60° F. or lower before use, or the mixture of anhydride and cellulose may be cooled and the catalyst preferably cooled is added thereto, or the anhydride may be severely cooled and after mixing with the cellulose mass will thereby cause the whole mass to be at a lowered temperature. If the temperature is allowed to rise much above 100° F., a lower viscosity ester can be expected. If a low viscosity ester is desired, the reaction temperature may be allowed to rise above 100° F., such as up to 140° F., or to some temperature between 100° and 140° F.

It is preferable not to employ as great an amount of catalyst in the esterification, if the proportion of liquid to cellulose is kept low, as formerly employed in the making of the cellulose esters because of the higher concentration with the same amount of catalyst than in processes in which a larger ratio of liquid to cellulose is used. I have found that in the esterification bath amounts of sulfuric acid catalyst approximately 2% of the weight of the cellulose have been sufficient in preparing high viscosity esters in processes embodying my invention.

In pretreating cellulose in accordance with my invention, the best activation of the cellulose has been obtained when acetic acid was the sole fatty acid used therein. However as one object of my invention is to prepare esters having a high propionyl or butyryl content, it is often desirable to employ some propionic or butyric acid with the acetic acid to obtain a higher propionyl or butyryl proportion in the esterification mixture. The fatty acid or 3–4 carbon atoms should, if present in the pretreating liquid, be in a minor proportion only. The pretreating liquid should be composed solely of lower fatty acid and a small proportion of sulfuric acid catalyst.

The minimum proportion of liquid for pretreating the cellulose should be approximately one-fourth part of liquid to one of cellulose. Obviously, my invention is useful for the pretreatment of cellulose with any proportion of pretreating liquid less than two parts per part of cellulose, although it is most useful with an amount of pretreating liquid of not more than one part per part of cellulose. A very satisfactory ratio of pretreating liquid to cellulose is approximately ¾:1 as this allows a good treatment of the cellulose and restricts the liquid to cellulose ratio in the esterification to not more than 4.75:1. With a much smaller proportion of pretreating liquid, it is sometimes desirable to add the cellulose in more than two parts, such as 3, 4 or even 5 additions.

The proportion of sulfuric acid employed in the pretreating liquid should be sufficient to degrade or cause physical breakdown of the cellulose portion treated in the initial step but should not be so great as to derogatorily affect the viscosity of the cellulose ester which is prepared from the cellulose. I have found that amounts of sulfuric acid of .001 part and less (as well as greater than this proportion) per part of cellulose initially added have been found to give good results in pretreating cellulose at a temperature of 100° F. for one-half hour.

One of the factors that governs the proportion of sulfuric acid to use in pretreating the cellulose is the salt content of the cellulose. The inorganic impurities present in cellulose buffer the action of the sulfuric acid in proportion to the amount of such impurities present. Therefore, the more pure the cellulose which is treated, the less proportion of sulfuric acid which is needed to obtain the necessary breakdown of the cellulose.

As pointed out above, other factors govern the proportion of sulfuric acid which is sufficient to cause physical breakdown of the cellulose without derogatorily affecting the viscosity of the cellulose ester formed in the subsequent esterification process. If a lower pretreatment temperature is used, such as 70°, 80° or 90° F. or temperatures therebetween, a greater proportion of sulfuric acid, a longer time for treatment of the initial portion of cellulose, or both is ordinarily necessary in pretreating the cellulose. If on the other hand, higher pretreating temperatures, such as 120° or 130° F. or even higher, are used, either less time of treatment of the initial portion of cellulose, a less proportion of sulfuric acid or both may be necessary to avoid derogatorily affecting the cellulose and with the higher pretreatment temperature, better efficiency is obtained. For treating ordinary commercial grade refined cotton linters, the practical lower limit of the proportion of sulfuric acid which may be employed, per part of cellulose to be esterified, in the pretreating liquid is .00005 part.

For the preparation of high viscosity esters it is desirable to keep the proportion of sulfuric acid in the pretreating liquid low. For example, approximately .001 part of sulfuric acid or less per part of cellulose to be esterified may be present in the pretreating liquid with an initial treatment at a temperature of approximately 100° F. without appreciably affecting the viscosity of the resulting ester, particularly with a time of ¼ to ½ hour for the initial portion of the pretreatment. In the preparation of the high viscosity esters, the first step of the pretreatment should be carried out only to the point where the cellulose portion treated exhibits physical breakdown.

For low viscosity esters the proportion of sulfuric acid in the pretreating liquid and the time and temperature of treating the cellulose portion in the first step of the pretreatment may both be greater than are used in the making of the high viscosity esters, if desired. For instance, proportions of sulfuric acid per part of cellulose of .003-.006 part may be employed under ordinary temperature conditions in a pretreatment in accordance with my invention using a time of one hour for the first pretreatment step. As pointed out herein, the proportion of sulfuric acid to be used is governed not only by whether a high viscosity or a low viscosity ester is desired, but also by the salt content of the cellulose treated, the temperature employed and the time allotted to the first step of the pretreatment.

Usually concentrated sulfuric acid is employed in the pretreatment, however, because of the small amount employed a more dilute sulfuric acid may be employed if present in an effective amount. The small amount of water thereby added is insignificant compared with the amount of water supplied by the cellulose even though the latter may have a moisture content of only 1 or 2%.

If the pretreatment is carried out in a mixer or like vessel in which a previous esterification has been carried out so that the vessel contains, as a residue, some of the reaction mixture prepared therein, allowance should be made for the sulfuric acid supplied thereby in making up the pretreating liquid. For instance, if 400 lbs. of cellulose is to be esterified and the pretreating liquid is to contain 0.4 lb. of sulfuric acid; if the residue from a previous esterification in the reaction vessel supplies 0.2 lb. of sulfuric acid, it is only necessary to add 0.2 lb. of sulfuric acid to the pretreating liquid to impart the desired sulfuric acid concentration to the pretreating liquid.

Although I have found that the use of approximately one-half of the cellulose to be esterified in the first step of the pretreatment is ordinarily most convenient in accordance with my invention, other convenient portions of the cellulose may be added particularly where the mixer is capable of handling the portion added. If desired, only a one-quarter portion of the cellulose may be added initially and the cellulose, after this initial treatment, will facilitate the treatment of the remaining cellulose particularly when a minimum of pretreating liquid is employed. On the other hand, a three-quarter portion of the cellulose may be added initially, particularly where an undue strain is not placed upon the mixer thereby and especially where an amount of pretreating liquid near the permissible maximum is employed. The most convenient portions of cellulose to use are ordinarily found within the range of ¼–½ of the total cellulose to be esterified, although other proportions outside of this range, which are found to be convenient, may be employed.

After the initial treatment, the remainder of the cellulose is added in one or more portions and the treatment is continued until the cellulose has been activated to the desired degree without derogatorily affecting the cellulose ester prepared therefrom. At 100° F., one hour is usually sufficient for this second pretreatment step, although one-half hour has been satisfactory for this step. With lower pretreatment temperatures a longer time for the second step will be desirable and vice versa.

The following examples illustrate my invention:

Example I

A mixture of 3 lbs. of acetic acid, 1 lb. of butyric acid and 3 c. c. of sulfuric acid (sp. gr. 1.84) was added to a 5 gal. Werner-Pfleiderer mixer. 2 lbs. of refined cotton linters was added thereto and the mass was stirred for one hour at 100° F. An additional 2 lbs. of cotton linters was then added and the mass was stirred for another hour at 100° F. 16 lbs. of butyric anhydride was then added and the reaction temperature was allowed to rise to a maximum of 140° F. After two hours, a very clear solution, free from fibers, was obtained. 2 lbs. of 50% acetic acid was added and after cooling to 100° F., the ester was isolated by precipitation into 50% acetic acid. A low viscosity cellulose acetate butyrate, containing 12% acetyl and 41% butyryl, was obtained.

Example II

A mixture of 30 lbs. of glacial acetic acid and 10 c. c. of sulfuric acid (sp. gr. 1.84) was placed in a Werner-Pfleiderer mixer and 20 lbs of refined cotton linters was added thereto. The mass was mixed together for one-half hour at approximately 100° F. An additional 20 lbs. of cotton linters was added and the mixing was continued for one hour at a temperature between 100 and 110° F. 160 lbs. of butyric anhydride was added to the mass and it was cooled to a temperature of approximately 55°. 170 c. c. of sulfuric acid dissolved in 1 lb. of acetic acid was then stirred in, inducing esterification, the temperature being held down so that the maximum reached was approximately 100° F. The esterification proper, that is from the addition of the sulfuric acid, took approximately eight hours to obtain complete reaction and the tetrachlorethane first-stage viscosity of the ester was approximately 300 seconds. A mixture of 30 lbs. of water and 170 lbs. of acetic acid was added to the mass and its hydrolysis was conducted at approximately 100° F. for about 70 hours. The resulting product was separated from the reaction mixture by precipitation and was washed and dried. The ester obtained had an acetyl content of 13% and a butyryl content of 36% and the viscosity in 10 parts of acetone was 226 C. P. S.

Example III 20 lbs. of refined cotton linters were added to a mixture of 30 lbs. of acetic acid and 10 c. c. of sulfuric acid contained in a 50 gal. Werner-Pfleiderer type mixer. This was run one-half hour at 100° F. and then 20 lbs. more of linters was added. The mixing was continued at a temperature of approximately 100–110° for one hour. 160 lbs. of butyric anhydride was added and the mixer was cooled to 50°. 260 c. c. of sulfuric acid in 1 lb. of acetic acid was added and the outside temperature was run at 40° F. for one hour, at 50° F. for one and one-half hours and was then raised to 70° F. The mass reached a maximum of 120° F. in two and one-half hours. At the end of 3 hours a hydrolyzing mixture consisting of 30 lbs. of distilled water and 170 lbs. of acetic acid was added and the mass was allowed to stand at 100° F. for a time to hydrolyze the ester. This batch exhibited a tetrachlorethane first-stage viscosity of 157 seconds.

Example IV 2 lbs. of cotton linters were treated one-half hour at 100° F. by stirring them together with 3 lbs. of acetic acid containing 1 c. c. of sulphuric acid. An additional 2 lbs. of cotton linters were then added and the pretreatment was continued one hour more at 100° F. 16 lbs. of butyric anhydride was added and the mixer was cooled to 55° F. 26 c. c. of sulfuric acid, dissolved in 260 c. c. of acetic acid, was added and the temperature was allowed to rise to 90° and the esterification was run for 10 hours. A hydrolyzing mixture, consisting of 2.5 lbs. of distilled water and 10 lbs. of acetic acid was added and the mass was allowed to stand for a time at 100° F. so as to partially hydrolyze the ester. A high viscosity product was obtained.

Example V 250 lbs. of refined cotton linters were added to a mixer containing a mixture of 385 lbs. of glacial acetic acid and 60 c. c. of concentrated sulfuric acid and the mixer was run for 30 minutes at 100° F. 250 lbs. of linters were added and the pretreatment was continued by running the mixer for 45 minutes longer.

2000 lbs. of butyric anhydride, which had been cooled to 30° F. was added to the mass followed by the addition to the mass of a mixture of 2100 c. c. of concentrated sulfuric acid and 10 lbs. of glacial acetic acid, which mixture had been cooled to a temperature below 70° F. prior to its addition to the mass. The temperature was allower to rise over a period of 5 hrs. to a maximum of 95° F. where it was kept until a clear solution, which had a tetrachlorethane viscosity of 800 sec., was obtained.

A mixture of 1500 lbs. of acetic acid and 500 lbs. of water was added to the mass and the cellulose ester therein was hydrolyzed by maintaining it at 100° F. for 100 hours. A cellulose acetate butyrate containing 13% acetyl and 37% butyryl and having a viscosity of 500 C. P. S. in 10% acetone at 25° C. was obtained.

Example VI 2 lbs. of refined cotton linters were treated one-half hour at 100° F. by stirring them together with 1 lb. of acetic acid containing 4 c. c. of sulfuric acid. An additional 2 lbs. of cotton linters were then added and the pretreatment was continued for one and a half hours at 100° F.

16 lbs. of butyric anhydride, which had been cooled to 30° F., was added to the mass which brought its temperature down to 65° F. A mixture of 14 c. c. of sulfuric acid in 14 c. c. of acetic acid was then added and the temperature of the mass was allowed to rise to a maximum of 100° F. The esterification was allowed to proceed for 12 hours and the resulting product was a substantially fully esterified cellulose ester having a butyryl content of approximately 50%.

A mixture of 12½ lbs. of acetic acid and 2½ lbs. of water was added to the reaction mass and the cellulose ester therein was hydrolyzed by maintaining it at 100° F. for 146 hours.

It is to be noted that by reducing the liquid to cellulose ratio in the making of high propionyl or high butyryl esters, which is made possible by our invention, the time is reduced considerably. For instance, making a cellulose ester of high viscosity using a formula having a 4.75:1 ratio of liquid to cellulose, the mixer may be tied up for only 11 hours by each batch, whereas with processes in which larger proportions of liquid to cellulose, such as 6:1, are used, the mixer is ordinarily tied up with each batch for 25 hours. The use of a lower liquid to solid ratio also makes it possible to charge larger batches into the mixer. Thus by increasing the concentration of anhydride and diminishing the amount of liquid in the esterification bath, the capacity of a mixer for producing cellulose esters of this type is considerably increased.

The esters which are prepared in accordance with my invention are particularly useful for use in molding compositions or in any other connection to which high propionyl or high butyryl esters are particularly adapted. My invention makes possible the production of either low viscosity esters or high viscosity esters or, if desired, esters having a medium viscosity may be prepared in an efficient manner.

Another advantage of my invention is that by keeping the proportion of acetic acid to cellulose low in the activated cellulose, the use of some acetic anhydride with the propionic or butyric anhydride is permissible in making high propionyl or high butyryl cellulose esters. For example, if it is desired to make a cellulose acetate butyrate of about 30% butyryl content, where formerly with an ordinary pretreatment of the cellulose with acetic acid it has been necessary to employ substantially all butyric anhydride as the esterifying anhydride, using a pretreatment in accordance with my invention, the esterifying anhydride may consist of approximately 2½ parts of butyric anhydride and 1½ parts of acetic anhydride. The high propionyl or butyryl cellulose esters are usually regarded as those cellulose esters containing at least 25% of butyryl and/or propionyl groups, the remainder of the acyl ordinarily being acetyl. My invention is particularly directed to the making of those esters as butyric or propionic anhydride are mainly depended upon for the esterification of the cellulose in their preparation. By the pretreatment method described herein, esterification, using those sluggish anhydrides, is facilitated resulting in considerable saving in the manufacture of the high propionyl or butyryl esters of cellulose.

I claim:

1. In a process of preparing cellulose esters having a high content of fatty acid radicals of 3-4 carbon atoms, the two-step method for the pretreatment of the cellulose essentially consisting of (1) mixing a ¼–¾ portion of the cellulose with a pretreating liquid essentially consisting of fatty acid of 2-4 carbon atoms, acetic acid predominating, and sufficient sulfuric acid within the range of .00005–.006 part by weight per part of cellulose to partially break down the cellulose, the pretreating liquid being ¼–2 parts by weight per part of cellulose to be esterified, and continuing the mixing until the cellulose portion exhibits physical break down, and (2) adding the remainder of the cellulose to the mass and continuing the pretreatment until all of the cellulose to be esterified is activated.

2. In a process of pretreating cellulose esters having a high butyryl content, the two-step method for the pretreatment of cellulose essentially consisting of (1) mixing a ¼–¾ portion of the cellulose with a pretreating liquid essentially consisting of fatty acid of 2-4 carbon atoms, acetic acid predominating, and sufficient sulfuric acid within the range of .00005–.006 part by weight per part of cellulose to partially break down the cellulose, the pretreating liquid being ¼–2 parts by weight per part of cellulose to be esterified, and continuing the mixing until the cellulose exhibits physical break down, and (2) adding the remainder of the cellulose to the mass and continuing the pretreatment until all of the cellulose to be esterified is activated.

3. In a process of preparing cellulose esters having a high content of fatty acid radicals of 3-4 carbons atoms, the two-step method for the pretreatment of the cellulose essentially consisting of (1) mixing a ¼-¾ portion of the cellulose with a pretreating liquid essentially consisting of fatty acid of 2-4 carbon atoms, acetic acid predominating, and sufficient sulfuric acid within the range of .00005-.006 part by weight per part of cellulose to partially break down the cellulose, the pretreating liquid being ¼-2 parts by weight per part of cellulose to be esterified, and continuing the mixing until the cellulose portion exhibits physical break down, and (2) adding the remainder of the cellulose to the mass in one portion and continuing the pretreatment until all of the cellulose to be esterified is activated.

4. In a process of preparing cellulose esters having a high content of fatty acid radicals of 3-4 carbon atoms, the two-step method for the pretreatment of the cellulose essentially consisting of (1) mixing a ¼-¾ portion of the cellulose with a pretreating liquid essentially consisting of fatty acid of 2-4 carbon atoms, acetic acid predominating, and sufficient sulfuric acid within the range of .00005-.006 part by weight per part of cellulose to partially break down the cellulose, the pretreating liquid being ¼-2 parts by weight per part of cellulose to be esterified, and continuing the mixing until the cellulose portion exhibits physical break down, and (2) adding the remainder of the cellulose to the mass in a plurality of portions and continuing the pretreatment until all of the cellulose to be esterified is activated.

5. A two-step method of activating 100 parts of cellulose to prepare it for esterification essentially consisting of (1) treating between 25 and 50 parts of the cellulose with 25-200 parts of a liquid essentially consisting of fatty acid of 2-4 carbon atoms, acetic acid predominating, and sufficient sulfuric acid within the range of .00005-.006 part by weight per part of cellulose to partially break down the cellulose, and continuing the mixing until the cellulose exhibits physical break down, and (2) adding the remainder of the cellulose to the mass and continuing the mixing until the 100 parts of cellulose have been activated.

6. A two-step method of activating cellulose to prepare it for esterification, essentially consisting of (1) mixing approximately one-half of the cellulose with a pretreating liquid essentially consisting of approximately ¾ part of acetic acid and approximately .001 part of sulfuric acid, per part of the total cellulose to be activated, for about ½ hour at approximately 100° F., and (2) subsequently adding the remainder of the cellulose to the mass and continuing the mixing until the cellulose has been rendered readily susceptible to esterification.

7. In a process of preparing cellulose esters having a high content of fatty acid radicals of 3 to 4 carbon atoms, the two-step method for the pretreatment of the cellulose essentially consisting of (1) mixing a ¼ to ¾ portion of the cellulose with a pretreating liquid essentially consisting of fatty acids of 2 to 4 carbon atoms, acetic acid predominating and sufficient sulphuric acid within the range of .00005-.006 part by weight per part of cellulose to partially break down the cellulose, the pretreating liquid being ¾ part by weight per part of cellulose to be esterified, and continuing the mixing until the cellulose portion exhibits physical breakdown, and (2) adding the remainder of the cellulose to the mass and continuing the pretreatment until all of the cellulose to be esterified is activated.

8. A two-step method of activating 100 parts of cellulose to prepare it for esterification essentially consisting of (1) treating between 25 and 50 parts of the cellulose with 25 to 200 parts of acetic acid and sufficient sulphuric acid within the range of .00005-.006 part by weight per part of cellulose to partially break down the cellulose and continuing the mixing until the cellulose exhibits physical breakdown, and (2) adding the remainder of the cellulose to the mass and continuing the mixing until the 100 parts of cellulose have been activated.

CARL J. MALM.